United States Patent
Perna

(10) Patent No.: US 9,052,399 B2
(45) Date of Patent: Jun. 9, 2015

(54) SCINTILLATOR PIXEL ARRAY WITH REDUCED CROSS TALK

(71) Applicant: Louis Perna, Elyria, OH (US)

(72) Inventor: Louis Perna, Elyria, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 277 days.

(21) Appl. No.: 13/716,105

(22) Filed: Dec. 15, 2012

(65) Prior Publication Data

US 2013/0193331 A1    Aug. 1, 2013

Related U.S. Application Data

(60) Provisional application No. 61/582,218, filed on Dec. 30, 2011.

(51) Int. Cl.
*G01T 1/20* (2006.01)

(52) U.S. Cl.
CPC .......... *G01T 1/2002* (2013.01); *Y10T 29/49826* (2015.01); *G01T 1/2018* (2013.01)

(58) Field of Classification Search
CPC ....................................................... G01T 1/20
USPC ........... 250/366, 368, 370.08, 370.09, 370.11
See application file for complete search history.

(56) References Cited

U.S. PATENT DOCUMENTS

| | | |
|---|---|---|
| 3,936,645 A | 2/1976 | Iversen |
| 5,262,649 A | 11/1993 | Antonuk et al. |
| 5,430,298 A | 7/1995 | Possin et al. |
| 5,453,609 A | 9/1995 | Gomez et al. |
| 5,517,031 A | 5/1996 | Wei et al. |
| 6,798,717 B2 | 9/2004 | Wiener-Avnear et al. |
| 7,307,301 B2 | 12/2007 | Possin et al. |
| 7,308,074 B2 | 12/2007 | Jiang et al. |
| 7,544,947 B2 | 6/2009 | Kerwin et al. |
| 7,825,384 B1 | 11/2010 | Saveliev |
| 2004/0114467 A1 | 6/2004 | Wiener-Avnear et al. |
| 2007/0210259 A1 | 9/2007 | Kerwin et al. |
| 2010/0127180 A1* | 5/2010 | Lifshitz et al. ............ 250/367 |
| 2010/0148074 A1 | 6/2010 | Menge et al. |
| 2010/0155610 A1* | 6/2010 | Menge et al. ............ 250/368 |
| 2010/0276600 A1 | 11/2010 | Ronda et al. |
| 2010/0294940 A1 | 11/2010 | Wieczorek |
| 2011/0042571 A1 | 2/2011 | Perna |

FOREIGN PATENT DOCUMENTS

WO    2007121000 A2    10/2007

OTHER PUBLICATIONS

Midwest Tungsten Service, "TIPS: How Thick Is the Film?," Midwest Tungsten Service, <http://www.tungsten.com/tipsthick.pdf>, downloaded Apr. 12, 2013, 2 pages.

International Search Report for PCT/US2012/070028 dated Apr. 19, 2013, 4 pgs.

* cited by examiner

*Primary Examiner* — David Porta
*Assistant Examiner* — Meenakshi Sahu
(74) *Attorney, Agent, or Firm* — Abel Law Group, LLP; Robert N. Young

(57) ABSTRACT

A scintillator pixel array can include a housing and a plurality of scintillator pixels within the housing. Further, the scintillator pixel array can include a grid structure within the housing. The grid structure can separate the plurality of pixels into rows and columns. Further, the grid structure can include an opaque layer configured to substantially prevent pixel-to-pixel cross talk within the plurality of scintillator pixels.

25 Claims, 8 Drawing Sheets

SCINTILLATOR PIXEL ARRAY WITH REDUCED CROSS TALK

CROSS-REFERENCE TO RELATED APPLICATION

This application claims priority under 35 U.S.C. §119(e) to U.S. Patent Application No. 61/582,218 entitled "Scintillator Pixel Array With Reduced Cross Talk," by Perna, filed Dec. 30, 2011, which is assigned to the current assignee hereof and incorporated herein by reference in its entirety.

BACKGROUND

1. Field of the Disclosure

The present disclosure is directed to scintillators, particularly to scintillator pixel arrays for radiation detectors.

2. Description of the Related Art

Scintillator pixel arrays have been employed in various applications that require non-destructive inspection of objects. For example, scintillator pixel arrays can be used within x-ray computed tomography imaging systems that are useful in medical applications for diagnosing and treating patients. Also, scintillator pixel arrays can be used within other x-ray computed tomography systems that are useful in security applications for looking inside luggage. Typically, a scintillator pixel array is installed in a detector adjacent to a photosensor array. The individual scintillator pixels are made of a scintillator material that is effective for detecting various types of radiation, including for example, x-rays. In general, a target is placed between an x-ray source and a detector. As the x-ray radiation passes through the target, the internal features of the target can cause the radiation to become attenuated. The level of attenuation can be determined based on the level of illumination provided by each scintillator pixel. The measured attenuation may be used to create images of the internal structure of the target.

Pixel-to-pixel cross talk, i.e., the transmission or sharing of light between adjacent pixels, can reduce the accuracy of detection by a photosensor and may produce false readings, produce images that are relatively difficult to read, or produce other unacceptable results.

Accordingly, the industry continues to need improvements in scintillator pixel arrays, particularly scintillator pixel arrays that have reduced cross talk.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to scintillator pixel arrays, and particularly, to scintillator pixel arrays that can be used in conjunction with x-ray scanner systems. For example, the scintillator pixel array can be part of a computed tomography system that can be used for medical imaging. Also, the scintillator pixel array may be used with other x-ray scanner systems, such as airport security scanners and x-ray systems used for non-destructive inspection of particular goods.

A reflective opaque layer may be applied to rows of adjacent pixels prior to affixing those rows to solid reflectors using an adhesive. The adhesive that is used to adhere each row to an adjacent reflector may be sandwiched, or otherwise contained, between the reflective opaque layer and the solid reflector. Moreover, any light produced by a particular pixel that is transmitted through the adhesive along the solid reflector can be substantially blocked from being transmitted to an adjacent pixel. Accordingly, pixel-to-pixel cross talk can be substantially reduced.

According to an aspect, each scintillator pixel within the scintillator pixel array includes a scintillator material such as, a scintillator crystal. The scintillator material can be sensitive to particular types of radiation, for example, X-rays, gamma rays, etc. such that when the material captures a particular type of radiation, the scintillator material responds by fluorescing or scintillating electromagnetic radiation at a particular wavelength or a particular spectrum of wavelengths. The fluoresced radiation, or scintillating electromagnetic radiation, can be converted to an electronic pulse by a photosensor, such as a photomultiplier tube, photodiode, or an array thereof, which converts the fluoresced radiation, or scintillating electromagnetic radiation, to electrical signals for processing. As such, the scintillator pixel array in conjunction with a photosensor array can provide a user with the ability to detect and record radiation events, which in the context of computed tomography, can enable users to create images useful for diagnosing and treating patients.

Figure 1:
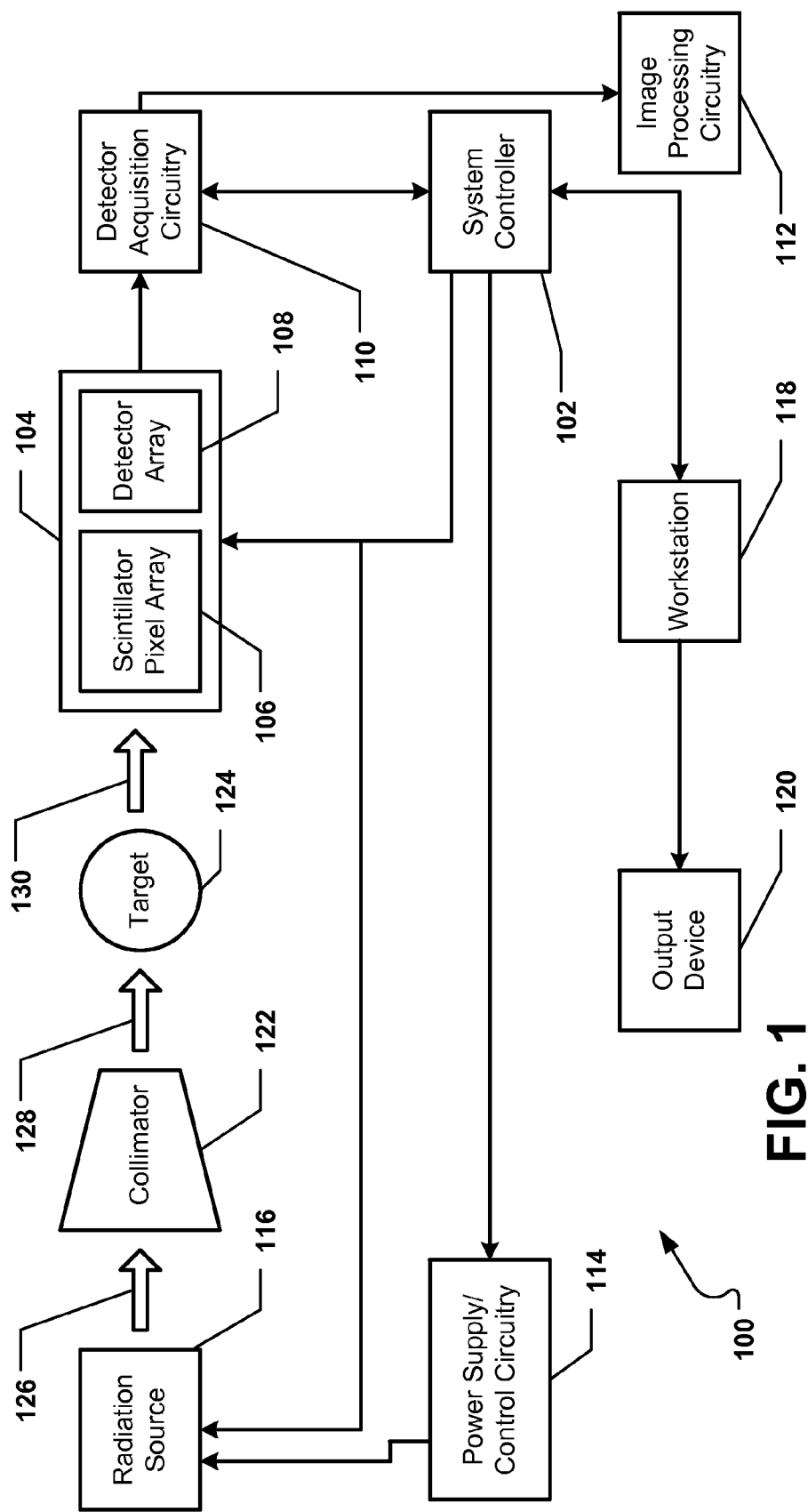
FIG. 1 includes a diagram of an x-ray computed tomography system in accordance with an embodiment.

FIG. 1 illustrates an exemplary x-ray computed tomography imaging system, generally designated 100. In a particular embodiment, the imaging system 100 can include a system controller 102. A radiation detector 104 can be coupled to the controller 102. In a particular aspect, the radiation detector 104 can include a scintillator pixel array 106 and a detector array 108 contained within a housing (not illustrated). In another aspect, the pixel array 106 and detector array 108 are not contained within a housing. Details concerning the construction of the scintillator pixel array 106 are described below in conjunction with FIG. 2 through FIG. 8. A skilled artisan will recognize that the detector array 108 can include an array of photosensors (not illustrated) arranged so that each photosensor is adjacent to a corresponding scintillator pixel (described below).

As depicted in FIG. 1, detector acquisition circuitry 110 can be coupled to the radiation detector 104 and image processing circuitry 112 can be coupled to the detector acquisition circuitry 110. FIG. 1 further illustrates that a power supply/control circuitry 114 can be coupled to the system controller 102. Further, a radiation source 116 can be coupled to the power supply/control circuitry 114, the system controller 102, and the radiation detector 104. A workstation 118 can be coupled to the system controller 102, and an output device 120 may be coupled to the workstation 118. Moreover, as illustrated, a collimator 122 may be positioned between the radiation source 116 and the radiation detector 104. A target 124 may be positioned between the collimator 122 and the radiation detector 104.

During operation, the radiation source 116 can emit radiation 126 toward the collimator 122 and the collimator 122 can collimate the radiation 126 as collimated beams 128. In certain embodiments, the radiation may be x-ray radiation, beta radiation, or gamma radiation. The collimated beams 128 of radiation 126 can be directed toward the target 124. In a particular aspect, the target 124 can be an animal, a human, baggage, a vehicle, a cargo container, an object, or any other target having internal features or contents. Further, the target 124 can be an industrial item to be scanned for quality control or inspection, e.g., a turbine airfoil. A portion of the radiation 126 can pass through the target 124 as attenuated radiation 130.

More specifically, internal features of the target 124 can at least partially reduce the intensity of the collimated beams 128 of radiation 126. For example, one internal feature may pass more radiation or less radiation than another internal feature. In turn, attenuated radiation 130 can impinge the radiation detector 104, specifically the scintillator pixels (described below) within the radiation detector 104. Each of the scintillator pixels can become illuminated to varying degrees of brightness based on the extent of attenuation. Corresponding photosensors (e.g., photodiodes) within the detector array can convert the light detected from the scintillator pixels into electrical signals. The system 100 can process these electrical signals to construct an image of the internal features within the target 124. In another aspect, the radiation source may be present within the target 124 and the radiation detector 104 can detect the presence of the radiation within the target 124.

In a particular aspect, the radiation source 116 can be controlled by the power supply/control circuit 114, which can provide power and control signals for examination sequences. The detector acquisition circuitry 110 can control acquisition of the signals generated in the radiation detector 104. The power supply/control circuit 114 can be responsive to signals from the system controller 102. Moreover, the system controller 102 can generally control operation of the imaging processing circuitry 112 to execute examination protocols and to process acquired image data.

The workstation 118 can be used as a user interface to the system 100. For example, the workstation 118 can be used for outputting system parameters, requesting examination, viewing images, and so forth. The workstation 118 can be configured to enable an operator, via one or more input devices (keyboard, mouse, touchpad, etc.), to control the operation of the system controller 102 and, if necessary, other components of the system 100. The output device 120 can include a display, a printer, a persistent memory or a combination thereof that can be used to output images generated during operation of the system 100.

In general, displays, printers, operator workstations, and similar devices may be local or remote from the system 100. For example, these interface devices may be positioned in one or more places within an institution or hospital, or in an entirely different location. As such, the interfaces devices may be linked to the image system 100 via one or more configurable networks, such as the internet, virtual private networks, and so forth. These and other input/output devices or interfaces may be incorporated into the imaging system 100 in accordance with embodiments of the present technique.

In a particular embodiment, the electronics within the detector acquisition circuitry 110, the system controller 102, or a combination thereof can include one or more electronic devices, such as an amplifier, a pre-amplifier, a discriminator, an analog-to-digital signal converter, a photon counter, another electronic device, or any combination thereof.

Further, in one embodiment, the photosensors (not illustrated) within the detector array 108 can include a device capable of spectral detection and resolution. For example, each of the photosensors can be a photodiode; a p-type-intrinsic type-n-type semiconductor region ("PIN") silicon diode; a photomultiplier tube ("PMT"); a silicon photomultiplier tube ("SiPM"); an avalanche photodiode ("APD"); or a hybrid PMT.

Figure 2:
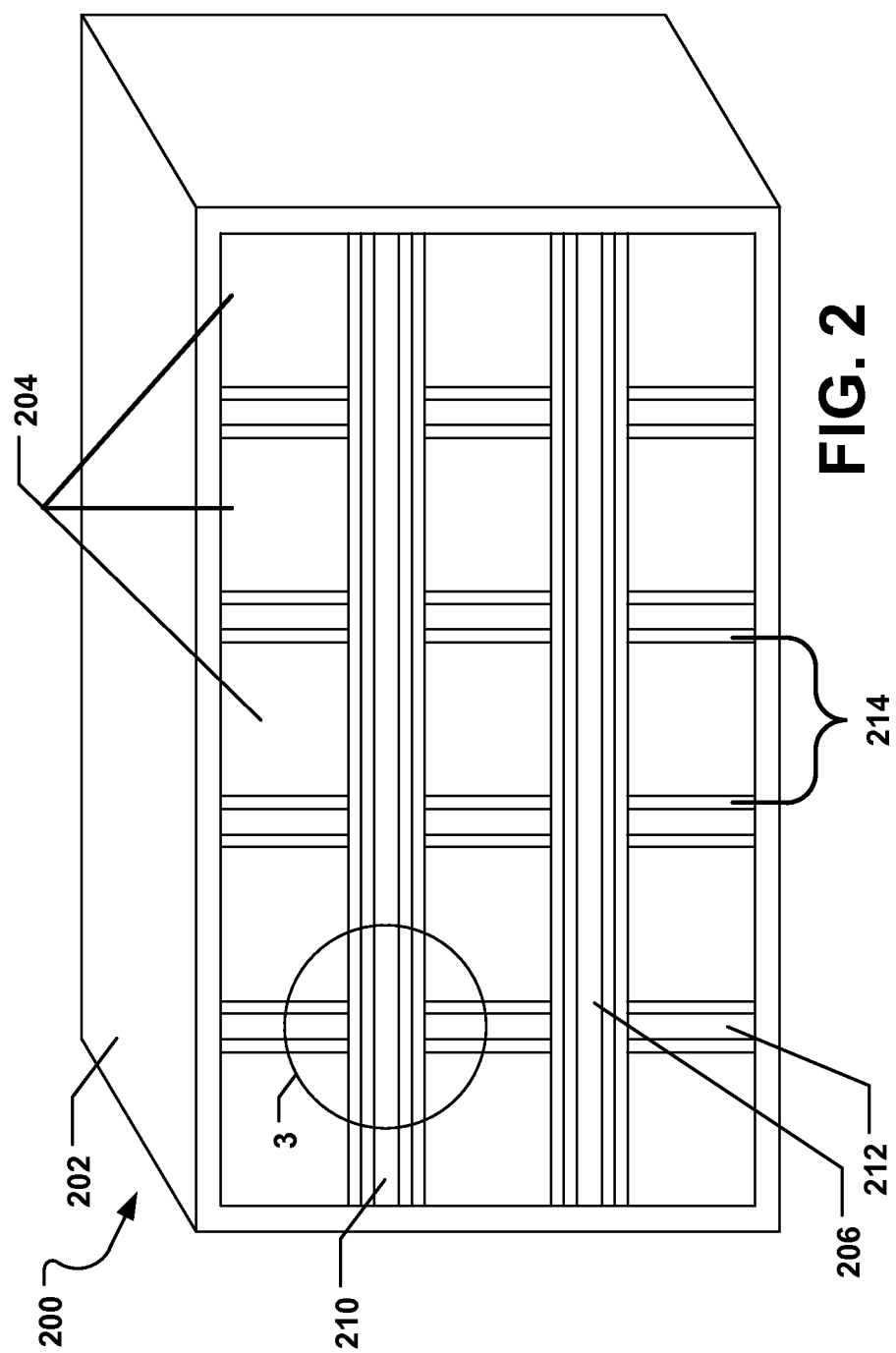
FIG. 2 includes a perspective view of a scintillator pixel array in accordance with an embodiment.

Referring to FIG. 2, details concerning the scintillator pixel array 106 are illustrated. As depicted, the scintillator pixel array 106 can include a housing 202. The housing 202 can be constructed from a metal material, such as aluminum, steel, etc. Further, the housing 202 can be constructed from a plastic material, such as an epoxy material. In particular, the housing 202 can be constructed from a white plastic material having reflective properties. Further, housing 202 can be constructed from an opaque reflective material. Otherwise, the housing 202 can be internally coated with an opaque reflective material, e.g., one or more of the opaque reflective materials described herein.

A plurality of scintillator pixels 204 can be disposed within the housing 202. Each scintillator pixel 204 can include a scintillator material. In accordance with an embodiment, the scintillator material can be a material selected from the group of materials including inorganic materials, organic materials, and a combination thereof. In more particular instances, the scintillator material can be formed of inorganic materials including, for example, halides, oxides, and a combination thereof. In one particular instance, the scintillator material can be a crystalline, inorganic material. Certain crystalline, inorganic materials can include rare-earth elements.

Embodiments herein can utilize a detector incorporating a scintillator material made of a crystalline inorganic material, such as BGO (e.g., $Bi_4Ge_3O_{12}$), LYSO (e.g., $Lu_{1.8}Y_{0.2}SiO_5$), LSO (e.g., $Lu_2SiO_5$), $LuI_3$, GSO (e.g., $Gd_2SiO_5$), CLYC (e.g., $Cs_2LiYCl_6$), CNLI (e.g., $Cs_2NaLaI_6$), CLLB (e.g., $Cs_2LiLaBr_6$), LuAP (e.g., $LuAlO_3$), LuYAP (e.g., $Lu_xY_{1-x}AlO_3$), LuAG (e.g., $Lu_3Al_5O_{12}$), $Lu_2Si_2O_7$, $GdI_3$, $SrI_2$, LGSO (e.g., $Lu_{1.8}Gd_{0.2}SiO_5$) GYSO (e.g., $GdYSiO_5$), LGYSO, CsI(Tl), CdWO4, and combinations thereof.

Skilled artisans will appreciate that the foregoing crystalline, inorganic materials can include dopants, which can be present as elemental species in minor amounts within the compound.

In other embodiments, the scintillator material can include an organic material. For example, suitable organic materials can include polymer materials. In certain instances, the scintillator material can incorporate a combination of inorganic and organic materials, such as any of the organic materials utilized above in combination with a polymer material.

In a particular aspect, each scintillator pixel 204 is substantially identically shaped. For example, each scintillator pixel 204 can be a parallelepiped having a rectangular cross-section. Further, each scintillator pixel 204 can be a parallelepiped having a square cross-section.

Each scintillator pixel 204 can have a width, a height, and a length (into the page at FIG. 2). In a particular aspect, the width and the height of each scintillator pixel 204 is substantially the same. Further, each scintillator pixel 204 is substantially identically sized. In a particular embodiment, the width and the height can be at least about 1.0 mm (0.04 inches). More specifically, the width and the height can be at least about 2.0 mm (0.08 inches), such as at least about 3.0 mm (0.12 inches) at least about 4.0 mm (0.16 inches), at least about 5.0 mm (0.2 inches), at least about 6.0 mm (0.24 inches), at least about 7.0 mm (0.28 inches), at least about 8.0 mm (0.32 inches), at least about 9.0 mm (0.35 inches), or at least about 10.0 mm (0.39 inches). In a particular aspect, the width and the height may be no greater than about 15.0 mm (0.6 inches).

In one aspect, the scintillator pixels 204 can be cubes. As such, the length of each scintillator pixel 204 can be substantially the same as the width and the height of each scintillator pixel 204. In another aspect, the length of each scintillator pixel 204 can be at least about 12.7 mm (0.5 inches). Further, the length of each scintillator pixel 204 can be at least about 19.1 mm (0.75 inches), such as at least about 25.4 mm (1.0 inches), at least about 31.8 mm (1.25 inches), at least about 38.1 mm (1.5 inches), at least about 50.8 mm (2.0 inches), at least about 63.5 mm (2.5 inches), at least about 76.2 mm (3.0 inches), at least about 88.9 mm (3.5 inches), at least about 101.6 mm (4.0 inches), at least about 114.3 mm (4.5 inches), or at least about 125.0 mm (5.0 inches). In another aspect, the length of each scintillator pixel 204 is not greater than about 254.0 mm (10.0 inches).

As further depicted in FIG. 2, the scintillator pixel array 106 can include a grid 206 that can provide structural support for the scintillator pixels 204 and substantially prevent cross talk between adjacent scintillator pixels 204. In a particular aspect, one or more parts of the grid 206 can be formed from septa material that is used during the construction of the scintillator pixel array 106, described in detail below in conjunction with FIG. 4. Further, the grid 206 can include the adhesive that is used during the construction of the scintillator pixel array 106 and any opaque layers installed during the construction of the scintillator pixel array 106.

In a particular aspect, the septa material can include a plastic, such as a polymer. Further, the septa material can include a reflective plastic, such as a reflective white plastic. In another aspect, the septa material can include a metal. For example, the septa material can include lead. Moreover, the septa material can include aluminum, such as an aluminum foil. In still another aspect, the septa material can include a composite material. For example, the septa material can include a lead/plastic composite material. Moreover, the septa material can be a solid reflector material.

In a particular aspect, the grid 206 can include a plurality of longitudinal walls 210 that can extend along the entire length of each row of scintillator pixels 204. Further, the grid 206 can include a plurality of lateral walls 212 that separate each adjacent scintillator pixel 204 within each row of scintillator pixels 204. Each lateral wall 212 can extend along a width of a scintillator pixel 204. The longitudinal walls 210 and the lateral walls 212 can include a solid reflector material. For example, the longitudinal walls 210 and lateral walls 212 can include the same material as the septa using during the construction of the scintillator pixel array 106.

In a particular aspect, a width of each longitudinal wall 210 can be substantially the same as a width of an adjacent row of scintillator pixels 204. Further, a height of each lateral wall 212 is substantially the same as a height of each adjacent scintillator pixel 204.

Each of the longitudinal walls 210 and lateral walls 212 can be arranged to establish a plurality of cells 214 within the grid 206. Depending on a location within the grid 206, each cell 214 can be space defined by two grid surfaces (corner location), three grid surfaces (edge location), or four grid surfaces (interior location). Moreover, each cell 214 can at least partially surround a scintillator pixel 204.

Each of the longitudinal walls 210 comprising the grid 206 can have a longitudinal wall thickness. In a particular aspect, the longitudinal wall thickness for each longitudinal wall 210 can be substantially the same. For example, the longitudinal wall thickness can be at least about 0.025 mm (0.001 inches). Further, the longitudinal wall thickness can be at least about 0.05 mm (0.002 inches, such as at least about 0.1 mm (0.004 inches), at least about 0.5 mm (0.02 inches), at least about 1.0 mm (0.04 inches), at least about 1.25 mm (0.05 inches), at least about 1.5 mm (0.06 inches), at least about 1.75 mm (0.07 inches), or at least about 2.0 mm (0.08 inches). In another aspect, the longitudinal wall thickness is not greater than about 2.5 mm (0.1 inches.

Each lateral wall 212 can include a lateral wall thickness. In a particular aspect, the lateral wall thickness for each lateral wall 212 can be substantially the same. For example, the lateral wall thickness can be at least about 0.025 mm (0.001 inches). Also, the lateral wall thickness can be at least about 0.05 mm (0.002 inches), such as at least about 0.1 mm (0.004 inches), at least about 0.5 mm (0.02 inches), at least about 1.0 mm (0.04 inches), at least about 1.25 mm (0.05 inches), at least about 1.5 mm (0.06 inches), at least about 1.75 mm (0.07 inches), or at least about 2.0 mm (0.08 inches). In another aspect, the lateral wall thickness is not greater than about 5.0 mm (0.2 inches), not greater than about 4.5 mm (0.18 inches), not greater than 4.0 mm (0.16 inches), not greater than 3.5 mm (0.14 inches), not greater than 3.0 mm (0.12 inches), or not greater than 2.5 mm (0.1 inches).

Figure 3:
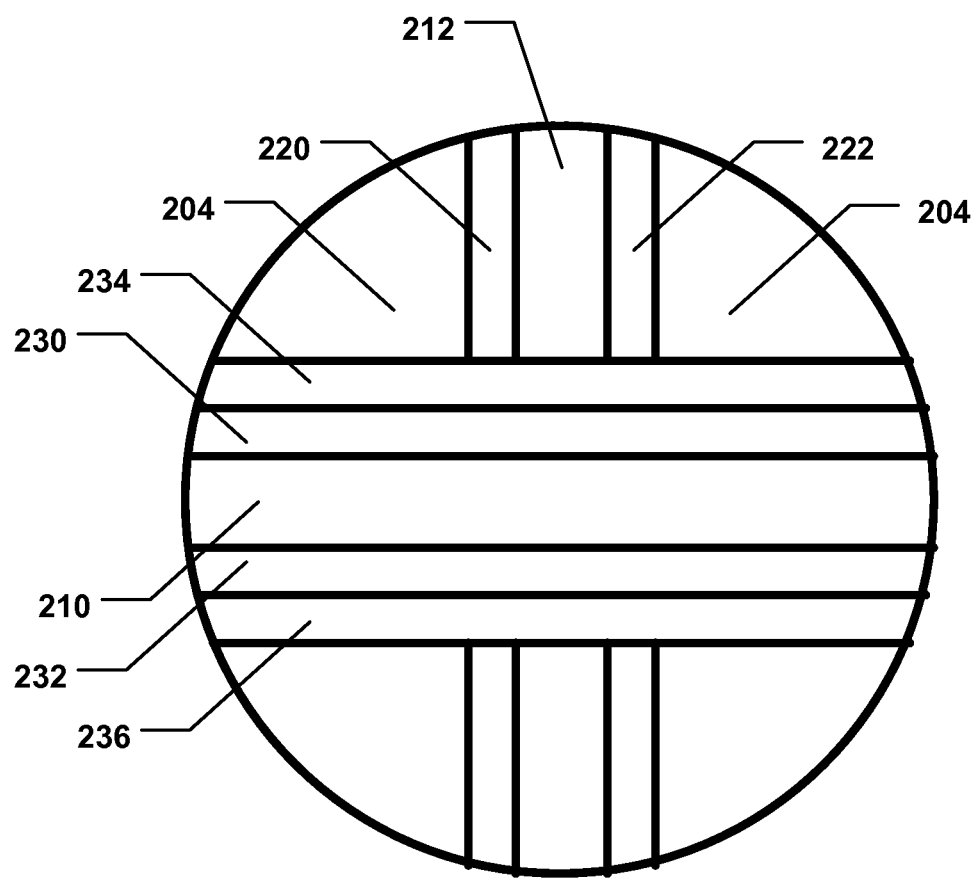
FIG. 3 includes a detailed view of a scintillator pixel array in accordance with an embodiment taken at Circle 3 in FIG. 2.

FIG. 3 depicts a close-up view of the scintillator pixel array 106 taken at Circle 3 in FIG. 2. Each lateral wall 212 can be coated on one side by a first lateral adhesive layer 220 and on another side by a second lateral adhesive layer 222. Further, each lateral wall 212 can be flanked on each side by a scintillator pixel 204. Accordingly, the lateral adhesive layers 220, 222 can alternatingly affix the lateral walls 212 and the scintillator pixels 204 to each other in order to form rows of scintillator pixels 204 separated by lateral walls 212, as illustrated in FIG. 2. The adhesive layers 220, 222 can include silicone, epoxy, double-side pressure sensitive tape (film) or a combination thereof. In a particular aspect, the adhesive layers 220, 222 are substantially transparent.

As depicted in FIG. 3, each longitudinal wall 210 can be flanked on each side by a first longitudinal adhesive layer 230 and a second longitudinal adhesive layer 232. A first longitudinal reflective opaque layer 234 can be adjacent and substantially affixed to the first longitudinal adhesive layer 230, and a second longitudinal reflective opaque layer 236 can be adjacent to and substantially affixed to the second longitudinal adhesive layer 232. Each reflective opaque layer 234, 236 can have substantially the same surface area as the area of the side of the longitudinal wall 210 adjacent thereto.

In a particular aspect, the longitudinal reflective opaque layers 234, 236, can include a reflective opaque paint. For example, the longitudinal reflective opaque layers 234, 236 can include a reflective opaque white pain. Further, the longitudinal reflective opaque layers 234, 236 can include a metal layer. The metal layer can include a physical vapor deposited metal layer. For example, the longitudinal reflective opaque layers 234, 236 can include a calcium fluoride layer, an aluminum layer, or a combination thereof. In another aspect, the opaque layers 234, 236 can include a metal halide layer. For example, the metal halide layer can include calcium fluoride.

In a particular aspect, for brush coated or dip coated layers, the longitudinal reflective opaque layers 234, 236 can have a thickness of at least about 125 microns (0.005 inches). Further, the longitudinal reflective opaque layers 234, 236 can have a thickness of at least about 150 microns (0.006 inches), at least about 175 microns (0.007 inches), at least about 200 microns (0.008 inches), or at least about 250 microns (0.010 inches). The longitudinal reflective opaque layers 234, 236 can have a thickness that is no greater than about 500 microns (0.020 inches), not greater than about 400 microns (0.016 inches), or no greater than 350 microns (0.014 inches). The thickness of the reflective opaque layers 234, 236 can be within a range between and including any of the minimum or maximum thickness values described above.

In another aspect, for a physical vapor deposited layer, the longitudinal reflective opaque layers 234, 236 can have a thickness of at least about 60 nanometers ($2.36 \times 10^{-6}$ inches). Moreover, the thickness of the longitudinal reflective opaque layers 234, 236 can be at least about 70 nanometers ($2.76 \times 10^{-6}$ inches), at least about 80 nanometers ($3.15 \times 10^{-6}$ inches), or at least about 90 nanometers ($3.54 \times 10^{-6}$ inches). Moreover, the thickness can be no greater than about 120 nanometers ($4.72 \times 10^{-6}$ inches), no greater than about 110 nanometers ($4.33 \times 10^{-6}$ inches), or no greater than about 100 nanometers ($3.4 \times 10^{-6}$ inches). The thickness of the reflective opaque layers 234, 236 can be within a range between and including any of the minimum or maximum thickness values described above.

In either aspect, the longitudinal reflective opaque layers 234, 236 are configured to substantially prevent light transmission within rows of pixels 204 along the longitudinal adhesive layers 230, 232. As indicated in FIG. 2 and FIG. 3, the longitudinal reflective opaque layers 234, 236 are positioned between the ends of the lateral adhesive layers 220, 222 and the length of the longitudinal adhesive layers 230, 232 to substantially prevent light transmission there between. Further, as illustrated, the longitudinal reflective opaque layers 234, 236 are substantially perpendicular to the lateral adhesive layers 220, 222 and substantially parallel to the longitudinal adhesive layers 230, 232. Moreover, the longitudinal reflective opaque layers 234, 236 can be adjacent to and substantially affixed to the ends of the lateral adhesive layers 220, 222 in order to effectively block any light transmission from the ends of the lateral adhesive layers 220, 222.

In a particular aspect, each longitudinal reflective opaque layer 234, 236 can permit no greater than about 0.9% light transmission there through. In other words, each opaque layer can allow less that 0.9% light transmission from each adjacent pixel via the lateral adhesive layers 220, 222. The light transmission may be determined using the formula $[L_{AP}/L_{WP}] \times 100$, wherein $L_{WP}$ is the intensity of the light generated by the pixel and $L_{AP}$ is the intensity of light measured adjacent to the pixel (i.e., with the opaque layer between the pixel and the measuring detector and within a distance of less than 2 mm from the pixel). $L_{WP}$ and $L_{AP}$ are measure at essentially the same time.

In another aspect, the light transmission is no greater than about 0.8%, no greater than about 0.7%, no greater than about 0.6%, no greater than about 0.5%, no greater than about 0.4%, no greater than about 0.3%, no greater than about 0.2%, or no greater than about 0.1%. Further, the light transmission is about 0.0%.

Accordingly, cross talk between adjacent pixels 204 within each row is substantially reduced and the accuracy of the scintillator pixel array 106 (FIG. 1 and FIG. 2), and any system in which the scintillator pixel array 106 (FIG. 1 and FIG. 2) is installed, is substantially increased.

In another aspect, lateral reflective opaque layers (not illustrated) may be applied to at least one side of each individual pixel 204 (e.g., a side adjacent to a lateral wall 212). In such an aspect, each lateral adhesive layer 220, 222 can be sandwiched between a lateral opaque layer and a lateral wall. The light transmission of each lateral reflective opaque layer can be substantially the same as the light transmission of the longitudinal reflective opaque layers 234, 236.

Figure 4:
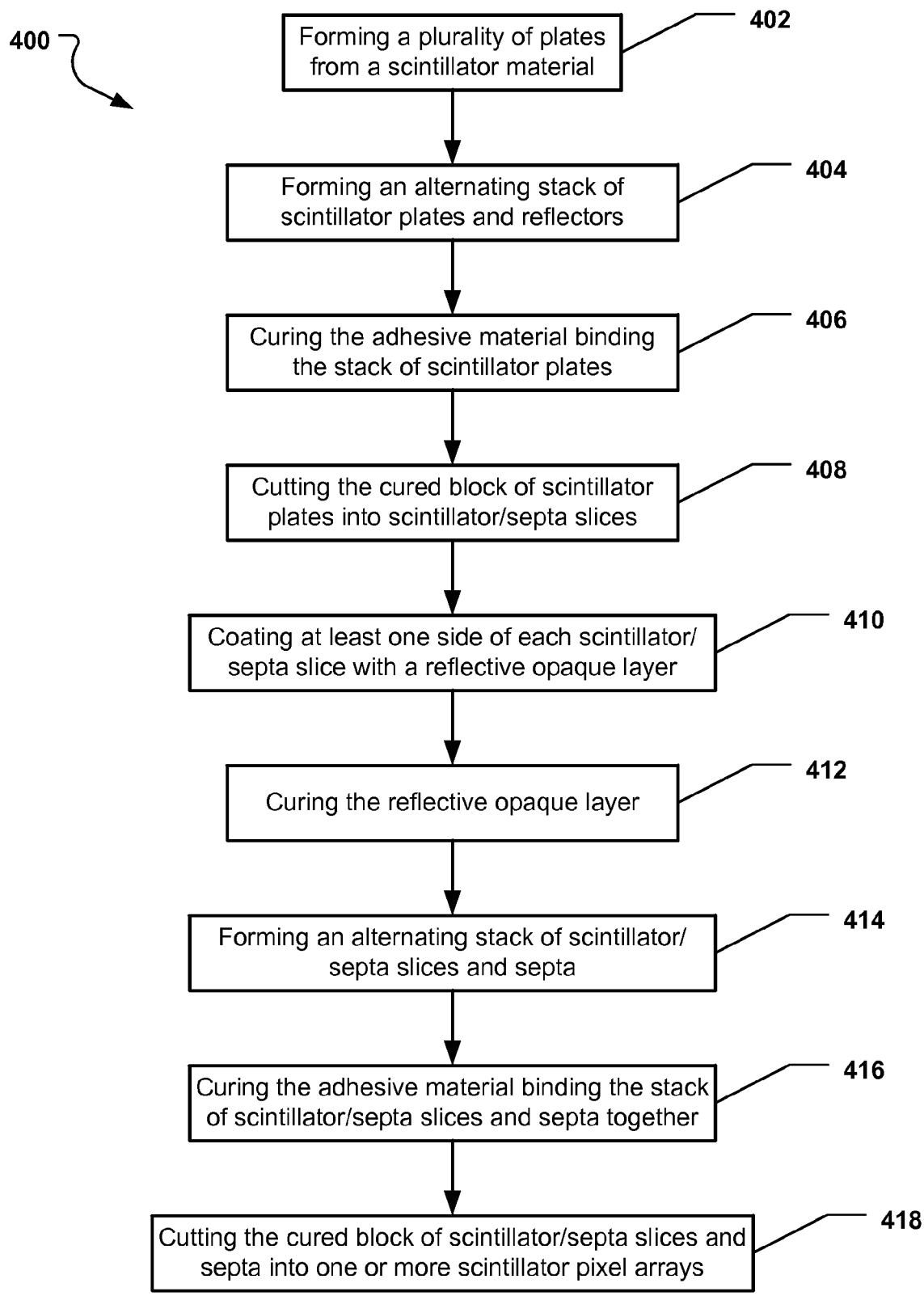
FIG. 4 includes a flow chart illustrating a method of making a scintillator pixel array in accordance with an embodiment.

Referring now to FIG. 4, a method of making a scintillator pixel array is illustrated and is generally designated 400. Beginning at block 402, the method 400 can include forming a plurality of plates from a scintillator material. The scintillator material can be one or more of the scintillator materials described herein. Further, a skilled artisan can appreciate that depending on the application a portion of the scintillator plates may be made from a first scintillator material and another portion of the scintillator plates may be made from a different scintillator material.

Figure 5:
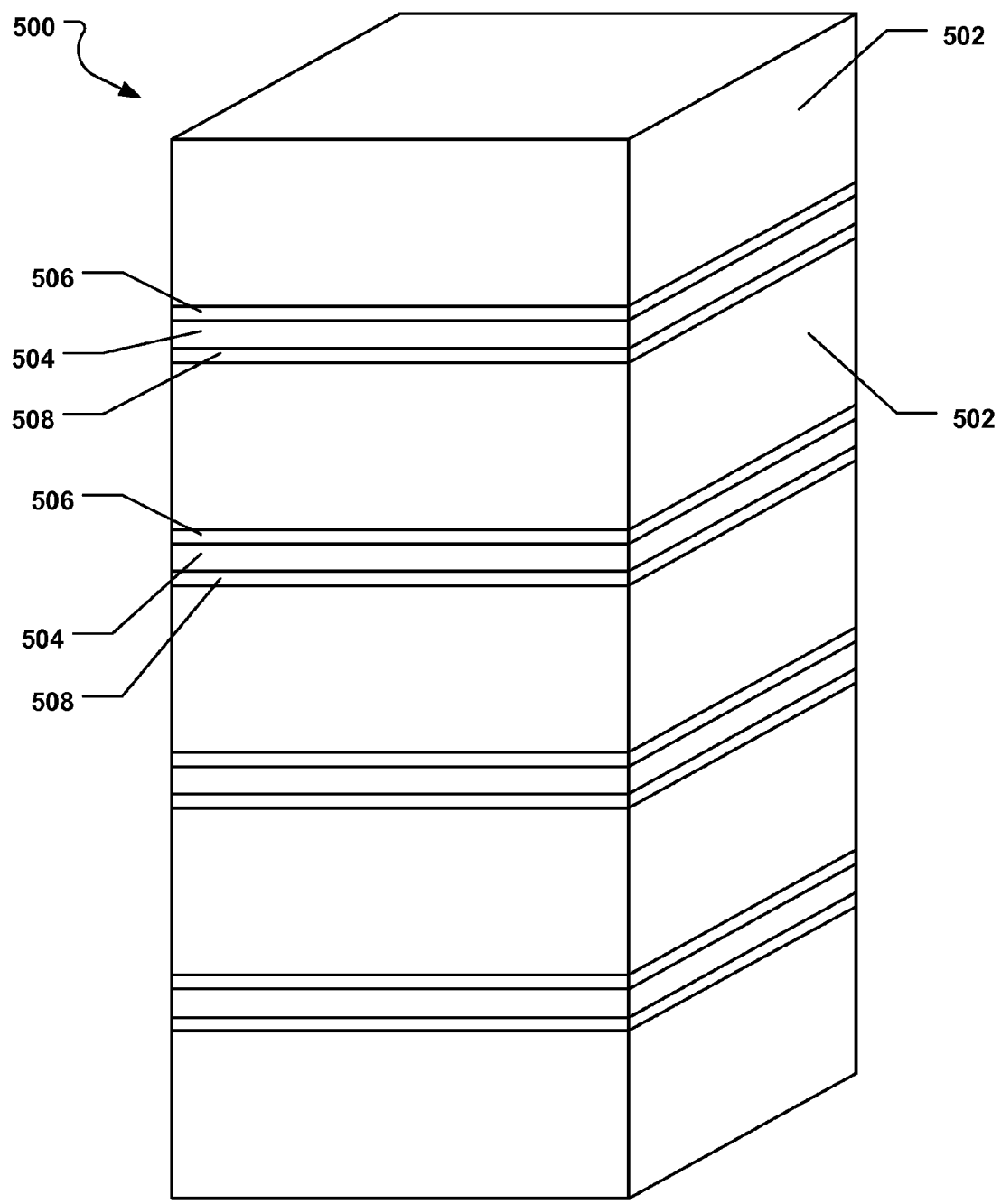
FIG. 5 includes a perspective view of a block alternatingly formed from a plurality of scintillator plates and a plurality of solid reflectors in accordance with an embodiment.
Figure 6:
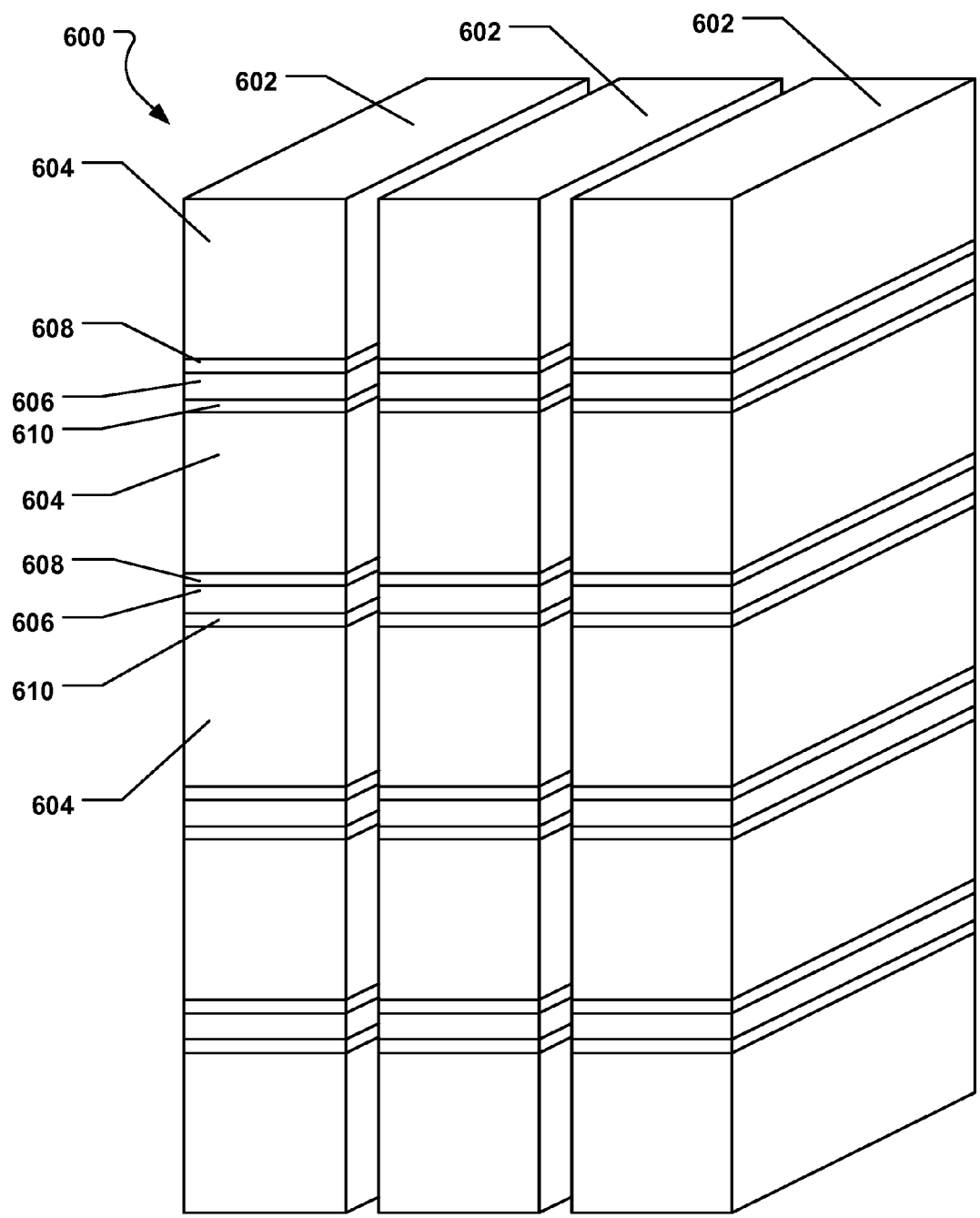
FIG. 6 includes a perspective view of a plurality of scintillator/septa slices cut from a block alternatingly formed from a plurality of scintillator plates and a plurality of solid reflectors in accordance with an embodiment.

Returning to the description of FIG. 4, at block 404, the method 400 can include forming an alternating block, or stack, of scintillator plates and septa. In a particular aspect, the septa can be a solid reflector, as described herein. FIG. 5 and FIG. 6 illustrate an exemplary stack, or block, designated 500. As depicted in FIG. 5 and FIG. 6, the block 500 includes a plurality of scintillator plates 502 and a plurality of septa 504. A first adhesive layer 506 and a second adhesive layer 508 can be adhered to, or otherwise disposed, on each respective side of each of the septa 504 in order to adhere each of the septa 504 to two adjacent scintillator plates 502. The adhesive layers may include one or more of the adhesives described herein. In another aspect, each scintillator plate 502 can be coated with an opaque layer before assembly so that each adhesive layer may be sandwiched between an opaque layer and the septa 504. Accordingly, after final assembly, illustrated in FIG. 2, each lateral wall can also include at least one lateral reflective opaque layer.

Continuing to block 406, the method 400 can include curing the adhesive material that binds the stack of scintillator plates and septa together to form a block. A skilled artisan will appreciate that the adhesive material may be cured by exposing the adhesive to visible light, ultraviolet light, infrared radiation (heat), or a combination thereof. Further, the adhesive may be cured at ambient temperature for a predetermined time period.

After curing is complete, the method 400 can include cutting the cured block of scintillator plates and septa into individual scintillator/septa slices at block 408. The block of scintillator plates and reflectors can be cut using a wire saw, a band, saw, a laser, or another suitable cutting tool. Further, to remove surface defects caused by the cutting operation, the plates can be milled, machined, polished, etc.

FIG. 6 illustrates a block 600 that has been cut into scintillator/septa slices 602. The scintillator/septa slices 602 can include alternating rows of a scintillator material 604 and a septa material 606 separated by adhesive layers 608, 610.

Returning to the description of FIG. 4, at block 410, the method 400 can include coating at least one side, or major surface, of each scintillator/septa slice 602 with an opaque layer of reflective material. The reflective material can include a specular reflector material. Further, the reflective material can include a diffuse reflector material.

In particular, the reflective opaque layer can be one of the reflective opaque layers described herein. Further, the reflective opaque layer can be applied using a brush coating method, a dip coating method, a vapor deposition coating method, or another coating method well known in the art. Moving the block 412, the reflective opaque layer can be allowed to cure, if necessary. The curing process may include exposing the reflective opaque layer to visible light, ultraviolet light, infrared radiation (heat), a reduced temperature, or a combination thereof. Further, the reflective opaque layer may be cured at ambient temperature for a predetermined time period.

In a particular aspect, each reflective opaque layer (longitudinal or lateral) can provide at least about 99% coverage of the surface on which the reflective opaque layer is applied. In another aspect, each reflective opaque layer can provide at least about 99.1% coverage, at least about 99.2% coverage, at least about 99.3% coverage, at least about 99.4% coverage, at least about 99.5% coverage, at least about 99.6% coverage, at least about 99.7% coverage, at least about 99.8% coverage, or at least about 99.9% coverage. Further, each reflective opaque layer can provide about 100% coverage.

Figure 7:
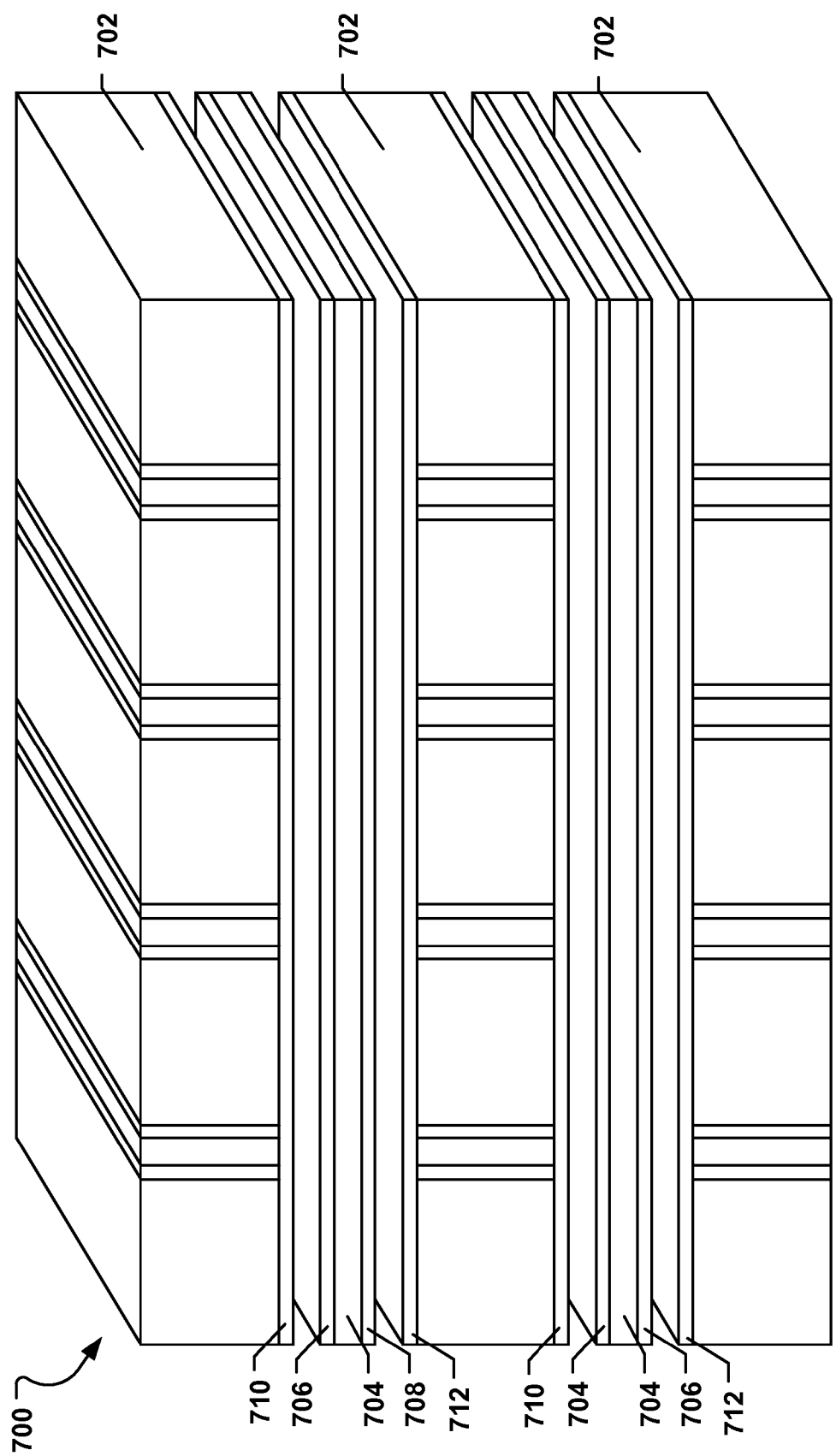
FIG. 7 includes an exploded, perspective view of a block alternatingly formed from a plurality of scintillator/septa slices and a plurality of solid reflectors in accordance with an embodiment.
Figure 8:
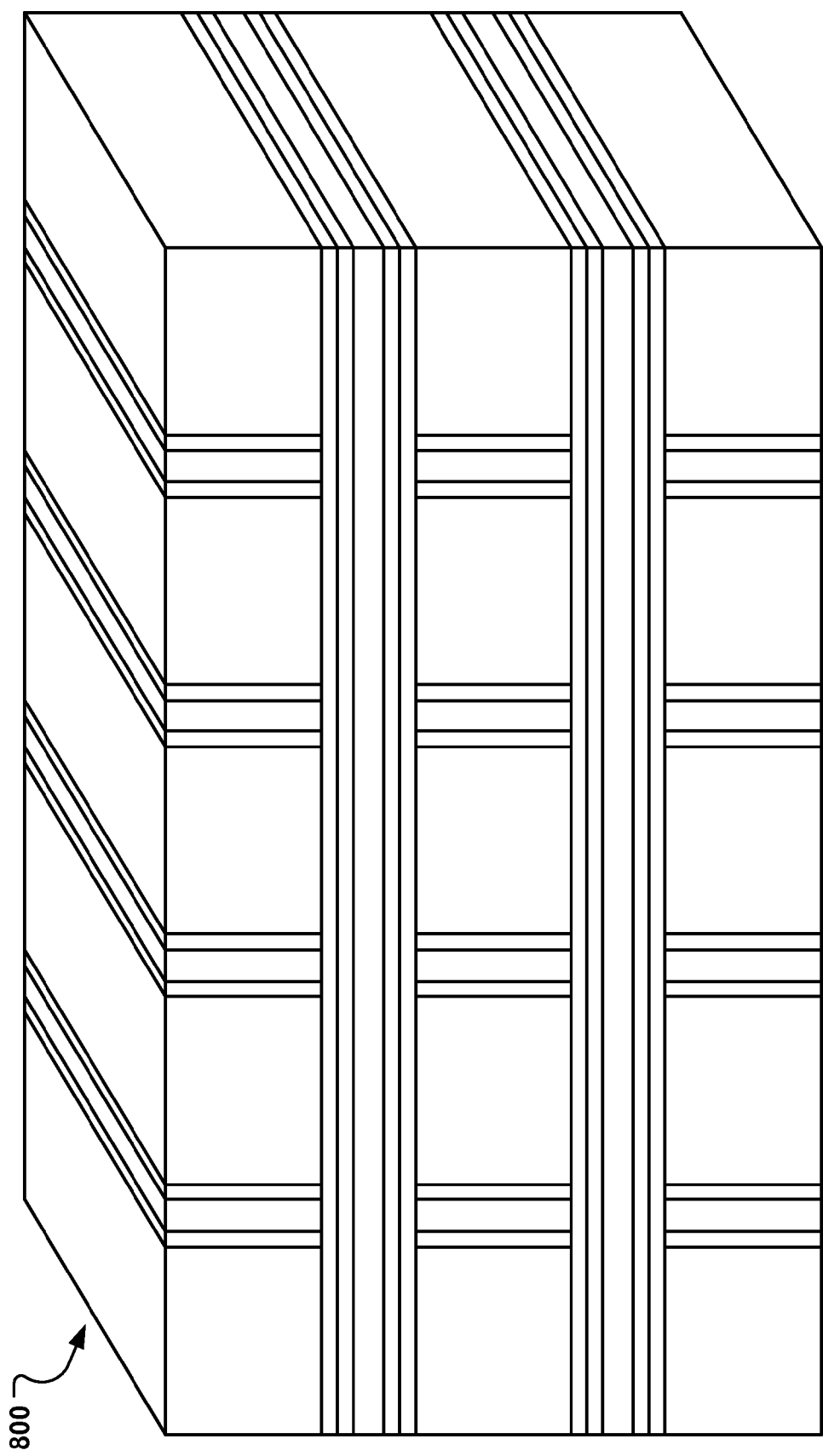
FIG. 8 includes a perspective view of an assembled block alternatingly formed from a plurality of scintillator/septa slices and a plurality of solid reflectors in accordance with an embodiment.

FIG. 7 and FIG. 8 depict a block 700 that can be formed from a plurality of scintillator/septa slices 702 and a plurality of septa 704. FIG. 7 includes an exploded, i.e., unassembled, view of the block 700, and FIG. 8 includes an assembled view of the block 700.

As illustrated in FIG. 7 and FIG. 8, each septum 704 can be coated on a first side by a first longitudinal adhesive layer 706 and coated on a second side by a second longitudinal adhesive layer 708. Further, each scintillator/septa slice 702 can be coated on a first side by a first longitudinal reflective opaque layer 710 and coated on a second side by a second longitudinal reflective opaque layer 712.

One of ordinary skill in the art can appreciate that certain scintillator/septa slices 702 may not be coated on both sides by a reflective opaque layer. For example, an upper scintillator/septa slice, a lower scintillator/septa slice, or a combination thereof may not be coated on both sides by a reflective opaque layer. An inner wall of a housing in which the block 700 can be installed may serve as a reflector and the block 700 may not include reflective opaque layers at the interface between the block 700 and the housing. However, in a particular embodiment, the housing may not be reflective and all sides of the block 700 (i.e., front side, back side, left side, right side, upper side, and bottom side) may be coated with a reflective opaque layer.

Returning to the description of FIG. 4, at block 416, the method 400 can include curing the adhesive material binding the stack of scintillator/septa slices together. The adhesive may be cured using one of the curing methods described herein. Proceeding to block 418, the method 400 can include cutting the cured block of scintillator/septa slices into scintillator pixel arrays. Depending on the application, the scintillator pixel arrays can be cut to a variety of different lengths. Examples of lengths are discussed above in conjunction with the description of the lengths of the scintillator pixels depicted in FIG. 2. In a particular aspect, the cured block of scintillator/septa slices may not be cut and the entire block of scintillator/septa slices can be used as a scintillator pixel array.

The system and method disclosed herein provides a relatively straightforward and simple way to build a scintillator pixel array having substantially reduced cross talk between adjacent scintillator pixels. By coating the scintillator/septa slices with reflective opaque layer during assembly any transmission of light between adjacent scintillator pixels can be substantially reduced, or otherwise blocked, by substantially blocking light transmission pathways that may exist along the adhesive layers in the absence of the reflective opaque layers. Accordingly, by substantially reducing any potential optical cross talk between adjacent pixels, each photosensor adjacent to a particular scintillator pixel may only detect light from that particular scintillator pixel. As such, light detection is enhanced and relatively better defined images may be produced. Moreover, false readings cause by pixel-to-pixel cross talk can be substantially reduced.

Although the scintillator pixel array 106 can be installed in an x-ray computed tomography imaging system 100 as depicted in FIG. 1, skilled artisans can appreciate that the scintillator pixel array 106 can be used in other detectors.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A detector device can include a photosensor array and a scintillator pixel array optically coupled to the photosensor. The scintillator pixel array can include a plurality of scintillator pixels arranged in a plurality of rows and a plurality of columns established by a grid structure, wherein the grid structure includes a plurality of longitudinal walls extending along each row of scintillator pixels wherein each longitudinal wall includes at least one opaque layer configured to reduce optical cross talk between pixels within each row of pixels.

Item 2. The detector device of Item 1, wherein each longitudinal wall includes a solid reflector, a first longitudinal adhesive layer disposed on a first side of the solid reflector, and a first longitudinal opaque layer overlying the first longitudinal adhesive layer, wherein the first longitudinal opaque layer substantially covers a side of a first row of pixels.

Item 3. The detector device of Item 2, wherein each longitudinal wall further includes a second longitudinal adhesive layer disposed on a second side of the solid reflector, and a second longitudinal opaque layer overlying the second longitudinal adhesive layer, wherein the second longitudinal opaque layer substantially covers a side of a second row of pixels.

Item 4. The detector device of Item 3, wherein each opaque layer includes a coated layer.

Item 5. The detector device of Item 4, wherein each coated layer includes a reflective opaque paint.

Item 6. The detector device of Item 4, wherein each coated layer includes a reflective opaque white paint.

Item 7. The detector device of any one of Items 3 to 6, wherein each opaque layer includes a layer thickness of at least about 125 microns.

Item 8. The detector device of Item 7, wherein the layer thickness is at least about 150 microns, at least about 175 microns, at least about 200 microns, or at least about 250 microns.

Item 9. The detector device of Item 7 or 8, wherein the layer thickness is no greater than about 500 microns, no greater than about 400 microns, or no greater than about 350 microns.

Item 10. The detector device of any one of Items 3 to 6, wherein each opaque layer includes a layer thickness within a range between and including about 125 microns and about 500 microns.

Item 11. The detector device of Item 3 or 4, wherein each opaque layer includes a metal layer.

Item 12. The detector device of Item 11, wherein each metal layer includes a physical vapor deposited metal layer.

Item 13. The detector device of Item 11 or 12, wherein each metal layer includes aluminum.

Item 14. The detector device of Item 3, wherein each opaque layer includes a metal halide layer.

Item 15. The detector device of Item 14, wherein each metal halide layer includes calcium fluoride.

Item 16. The detector device of any one of Items 3 and 11 to 15, wherein each opaque layer includes a layer thickness of at least about 60 nanometers (2.36×10-6 inches).

Item 17. The detector device of Item 16, wherein the layer thickness is at least about 70 nanometers, at least about 80 nanometers, or at least about 90 nanometers.

Item 18. The detector device of Item 16 or 17, wherein the layer thickness is no greater than about 120 nanometers, no greater than about 110 nanometers, or no greater than about 100 nanometers.

Item 19. The detector device of any one of Items 3 and 11 to 15, wherein each opaque layer includes a layer thickness within a range between an including about 60 nanometers and about 120 nanometers.

Item 20. The detector device of any one of Items 3 to 19, wherein each opaque layer includes a light transmission of no greater than about 0.9%.

Item 21. The detector device of Item 20, wherein the light transmission is no greater than about 0.8%, no greater than about 0.7%, no greater than about 0.6%, no greater than about 0.5%, no greater than about 0.4%, no greater than about 0.3%, no greater than about 0.2%, or no greater than about 0.1%.

Item 22. The detector device of Item 20 or 21, wherein the light transmission is about 0.0%.\

Item 23. The detector device of any one of Items 3 to 22, wherein the grid structure further includes a plurality of lateral walls, wherein each lateral wall is affixed to a first pixel by a first lateral adhesive layer and a second pixel by a second lateral adhesive layer and wherein at least one of the opaque layers is configured to block light transmission via the adhesive layers.

Item 24. The detector device of any one of Items 3 to 23, wherein each opaque layer is affixed to a surface of a row of pixels such that the opaque layer is adjacent to an end of each lateral adhesive layer.

Item 25. The detector device of any one of Items 3 to 24, wherein each opaque layer is substantially perpendicular to the lateral adhesive layers.

Item 26. The detector device of any one of Items 3 to 25, wherein each opaque layer includes a surface coverage on the surface to which the opaque layer is applied of at least about 99%.

Item 27. The detector device of Item 26, wherein the surface coverage is at least about 99.1%, at least about 99.2%, at least about 99.3%, at least about 99.4%, at least about 99.5%, at least about 99.6%, at least about 99.7%, at least about 99.8%, or at least about 99.9%.

Item 28. The detector device of Item 27, wherein the surface coverage is about 100%.

Item 29. A scintillator pixel array can include a housing, a plurality of scintillator pixels within the housing, and a grid structure separating the plurality of pixels into rows of pixels and columns of pixels, wherein the grid structure includes at least one opaque layer along a row of pixels configured to prevent optical cross talk between pixels within the row of pixels.

Item 30. A scintillator pixel array can include a plurality of scintillator pixels, and a grid structure separating the plurality of pixels into rows and columns, wherein the grid structure includes an opaque layer configured to substantially prevent pixel-to-pixel cross talk within the plurality of scintillator pixels.

Item 31. A method of making a scintillator pixel array can include fabricating a row of scintillator members and septa and coating a major surface of the row with an opaque layer of reflective material.

Item 32. A method of assembling a scintillator pixel array can include forming a stack of scintillator plates and septa, wherein each plate is bonded to at least one adjacent septum, cutting the stack into a plurality of scintillator/septa slices having alternating rows of a scintillator material and a septa material, and applying an opaque layer of reflective material to at least one major surface of the scintillator/septa slice.

Item 33. The method of Item 32, further including forming a stack of scintillator/septa slices and septa, wherein each plate is bonded to at least one adjacent septum.

Item 34. The method of Item 32 or 33, wherein the opaque layer includes a reflective opaque paint.

Item 35. The method of Item 34, wherein the reflective opaque paint includes a reflective opaque white paint.

Item 36. The method device of any one of Items 32 to 35, the opaque layer includes a layer thickness of at least about 125 microns.

Item 37. The method of Item 36, wherein the layer thickness is at least about 150 microns, at least about 175 microns, at least about 200 microns, or at least about 250 microns.

Item 38. The method of Item 36 or 37, wherein the layer thickness is no greater than about 500 microns, no greater than about 40 microns, or no greater than 350 microns.

Item 39. The method of any one of Items 32 to 35, wherein the opaque layer includes a layer thickness within a range between and including about 125 microns and about 500 microns.

Item 40. The method of Item 32 or 33, wherein the opaque layer includes a metal layer.

Item 41. The method of Item 40, wherein the metal layer includes a physical vapor deposited metal layer.

Item 42. The method of Item 41, wherein the physical vapor deposited metal layer includes aluminum.

Item 43. The method of Item 32 or 33, wherein the opaque layer includes a metal halide layer.

Item 44. The method of Item 43, wherein the metal halide layer includes calcium fluoride.

Item 45. The method of any one of Items 32, 33, and 40 to 44, wherein the opaque layer includes a layer thickness of at least about 60 nanometers.

Item 46. The method of Item 45, wherein the layer thickness is at least about 70 nanometers, at least about 80 nanometers, or at least about 90 nanometers.

Item 47. The method of Item 45 or 46, wherein the layer thickness is no greater than about 120 nanometers, no greater than about 110 nanometers, or no greater than about 100 nanometers.

Item 48. The method of any one of Items 32, 33, and 40 to 44, wherein the opaque layer includes a layer thickness within a range between an including about 60 nanometers and about 120 nanometers.

Item 49. The method of any one of Items 32 to 48, wherein the opaque layer includes a light transmission of no greater than about 0.9%.

Item 50. The method of Item 49, wherein the light transmission is no greater than about 0.8%, no greater than about 0.7%, no greater than about 0.6%, no greater than about 0.5%, no greater than about 0.4%, no greater than about 0.3%, no greater than about 0.2%, or no greater than about 0.1%.

Item 51. The method of Item 49 or 50, wherein the light transmission is about 0.0%.

Item 52. The method of any one of Items 32 to 51, wherein the opaque layer includes a surface coverage on the surface to which the opaque layer is applied of at least about 99%.

Item 53. The method of Item 52, wherein the coverage is at least about 99.1%, at least about 99.2%, at least about 99.3%, at least about 99.4%, at least about 99.5%, at least about 99.6%, at least about 99.7%, at least about 99.8%, or at least about 99.9%.

Item 54. The method of Item 52 or 53, wherein the coverage is about 100%.

Item 55. The method of any one of Items 32 to 54, wherein the reflective material includes a specular reflective material.

Item 56. The method of any one of Items 32 to 55, wherein the reflective material includes a diffuse reflective material.

Item 57. A scintillator pixel array can include a plurality of scintillator pixels and a grid structure separating the plurality of pixel into rows of pixels and columns of pixels. The grid structure can include at least one longitudinal wall along a row of pixels, at least one longitudinal reflective opaque layer between the longitudinal wall and the row of pixels, at least one lateral wall disposed between two adjacent pixels, and at least one lateral reflective opaque layer between the lateral wall and each of the two adjacent pixels, wherein the at least one longitudinal opaque layer and the at least one lateral reflective opaque layer are configured to prevent pixel-to-pixel cross talk within the scintillator pixel array.

Item 58. A scintillator pixel array can include a plurality of scintillator pixels and a grid structure separating the plurality of pixel into rows of pixels and columns of pixels. The grid structure can include at least one longitudinal reflective opaque layer disposed on each row of pixels, and at least one lateral reflective opaque layer disposed on each pixels, wherein the at least one longitudinal opaque layer and the at least one lateral reflective opaque layer are configured to prevent pixel-to-pixel cross talk within the scintillator pixel array.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A detector device, comprising:
    a photosensor array; and
    a scintillator pixel array optically coupled to the photosensor, the scintillator pixel array comprising a plurality of scintillator pixels arranged in a plurality of rows and a plurality of columns established by a grid structure, wherein the grid structure comprises at least one longitudinal wall and at least one lateral wall,
    wherein:
        the longitudinal wall extends between a first scintillator pixel in a first column and a second scintillator pixel in the first column;
        a first longitudinal adhesive layer is disposed on a first side of the longitudinal wall;
        a second longitudinal adhesive layer is disposed on a second side of the longitudinal wall;
        a first longitudinal opaque layer is disposed adjacent to the first scintillator pixel and between the first longitudinal adhesive layer and the first scintillator pixel; and
        a second longitudinal opaque layer is disposed adjacent to the second scintillator pixel and between the second longitudinal adhesive layer and the second scintillator pixel,
        wherein each opaque layer includes a light transmission of no greater than about 0.9%, and
    wherein:
        the lateral wall extends between the first scintillator in the first column and the third scintillator in a second column,
        a third lateral adhesive layer is disposed on a third side of the lateral wall and adjacent to the first scintillator; and
        a fourth lateral adhesive layer is disposed on a fourth side of the lateral wall and adjacent to the third scintillator.

2. The detector device of claim 1, wherein the longitudinal wall comprises a solid reflector.

3. The detector device of claim 1, wherein the lateral wall comprises a solid reflector.

4. The detector device of claim 1, wherein no opaque layer is disposed between the lateral wall and the first scintillator pixel and no opaque layer is disposed between the lateral and the third scintillator pixel.

5. The detector device of claim 1, wherein each opaque layer comprises a coated layer.

6. The detector device of claim 1, wherein each opaque layer comprises a layer thickness of at least about 125 microns.

7. The detector device of claim 6, wherein the layer thickness is no greater than about 500 microns.

8. The detector device of claim 1, wherein each opaque layer comprises a metal layer.

9. The detector device of claim 8, wherein each metal layer comprises a physical vapor deposited metal layer.

10. The detector device of claim 8, wherein each metal layer comprises aluminum.

11. The detector device of claim 1, wherein each opaque layer comprises a metal halide layer.

12. The detector device of claim 11, wherein each metal halide layer comprises calcium fluoride.

13. The detector device of claim 1, wherein the first and the second scintillator pixels are on immediately adjacent rows, and the first and the third scintillator pixels are on a same row.

14. The detector device of claim 1, wherein the lateral wall is affixed to the first pixel by the third lateral adhesive layer and affixed to the third pixel by the fourth lateral adhesive layer and wherein the first opaque layer is configured to at least partially block light transmission via the third and fourth lateral adhesive layers.

15. The detector device of claim 14, wherein the first opaque layer is affixed to a surface of the first pixel and a surface of the third pixel such that the first opaque layer is adjacent to an end of each of the third and fourth lateral adhesive layers.

16. The detector device of claim 3, wherein the first opaque layer is configured to cover at least about 99% of a surface of the first pixel and the second opaque layer is configured to cover at least about 99 of a surface of the second pixel.

17. A scintillator pixel array comprising:
 a housing;
 a plurality of scintillator pixels within the housing; and
 a grid structure separating the plurality of pixels into rows of pixels and columns of pixels, wherein the grid structure comprises at least one longitudinal wall and at least one lateral wall,
 wherein:
  the longitudinal wall includes a solid reflector extending between a first scintillator pixel in a first column and a second scintillator pixel in the first column;
  a first longitudinal adhesive layer is disposed on a first side of the longitudinal wall;
  a second longitudinal adhesive layer disposed on a second side of the longitudinal wall;
  a first opaque layer is disposed adjacent to the first scintillator pixel and between the first longitudinal adhesive layer and the first scintillator,
  a second opaque layer is disposed adjacent to the second scintillator pixel and between the second longitudinal adhesive layer and the second scintillar pixel,
  wherein each opaque layer includes a light transmission of no greater than about 0.9%, and
 wherein:
  the later wall extends between the first scintillator in the first column and a third scintillator on a second column,
  a third lateral adhesive layer is disposed on a first side of the lateral wall and adjacent to the first scintillator, and
  a fourth lateral adhesive layer is disposed on a second side of the lateral wall and adjacent to the third scintillator.

18. A method of assembling a scintillator pixel array, comprising:
 forming a stack of scintillator plates and first septa, wherein each plate is bonded to at least one adjacent septum of the first septa;
 cutting the stack into a plurality of scintillator/septa slices having alternating rows of a scintillator material and a septa material; and
 applying an opaque layer of reflective material to at least one major surface of the scintillator/septa slice.

19. The method of claim 18, further comprising forming an alternating stack of scintillator/septa slices and second septa, wherein each scintillator/septa slice is bonded to at least one adjacent septum of the second septa.

20. The method of claim 18, wherein the opaque layer comprises a reflective opaque paint.

21. The method of claim 18, wherein the opaque layer comprises a layer thickness within a range between and including about 125 microns and about 500 microns.

22. The method of claim 18, wherein the opaque layer comprises a metal layer.

23. The method of claim 18, wherein the opaque layer includes a light transmission of no greater than about 0.9%.

24. The method of claim 18, wherein the reflective material comprises a specular reflective material.

25. The method of claim 18, wherein the reflective material comprises a diffuse reflective material.

* * * * *

UNITED STATES PATENT AND TRADEMARK OFFICE
CERTIFICATE OF CORRECTION

Page 1 of 1

PATENT NO. : 9,052,399 B2
APPLICATION NO. : 13/716105
DATED : June 9, 2015
INVENTOR(S) : Louis Perna It is certified that error appears in the above-identified patent and that said Letters Patent is hereby corrected as shown below:

In the Claims

Column 14, line 53, delete "lateral" and insert therefor --lateral wall--

Column 15, line 17, delete "and fourth" and insert therefor --and the fourth--
    line 22, delete "99" and insert --99%--
    line 43, delete "scintillar" and insert --scintillator--

Column 16, line 4, delete "later" and insert --lateral--
    line 5, delete "on" and insert --in--
    line 25, delete "alternating" and insert --alternating--

Signed and Sealed this
Twelfth Day of April, 2016

Michelle K. Lee
*Director of the United States Patent and Trademark Office*